United States Patent [19]
Harrison et al.

[11] Patent Number: 6,081,895
[45] Date of Patent: Jun. 27, 2000

[54] METHOD AND SYSTEM FOR MANAGING DATA UNIT PROCESSING

[75] Inventors: David Michael Harrison, Mesa; Christoph Andreas Roden, Tempe; Gregory Allen King, Phoenix, all of Ariz.

[73] Assignee: Motorola, Inc., Schaumburg, Ill.

[21] Appl. No.: 08/949,082

[22] Filed: Oct. 10, 1997

[51] Int. Cl.[7] ...................................................... H04L 9/00

[52] U.S. Cl. .............................. 713/189; 380/28; 380/37; 713/167; 713/190

[58] Field of Search ............................... 380/21, 3, 4, 37; 710/6, 20, 22; 713/167, 189–190; 370/94

[56] References Cited

U.S. PATENT DOCUMENTS

| | | | |
|---|---|---|---|
| 4,601,586 | 7/1986 | Bahr et al. | 370/94 |
| 5,825,878 | 10/1998 | Takahashi et al. | 380/4 |

*Primary Examiner*—Gail O. Hayes
*Assistant Examiner*—Christopher M. Tucker
*Attorney, Agent, or Firm*—Gregory J. Gorrie

[57] ABSTRACT

A cryptographic controller (100) installs and manages a channel for processing data units. The cryptographic controller (100) performs background staging of programs, context, and data units for the programmable crypto engine (14) and configurable crypto engine (16). The cryptographic controller (100) is a secure, hardware operating system capable of managing high performance crypto processing on the order of 1500 million instructions per second (MIPS).

23 Claims, 11 Drawing Sheets

| DWORD OFFSET | DESCRIPTION |
|---|---|
| 00 | DU HEADER |
| 01 | COMMAND |
| 02-4094 | PARAMETER DATA |
| LAST DWORD | FRAME CHECK SEQUENCE |

←—— 32 BITS ——→

FIG. 10

DU HEADER FORMAT — 606

| TYPE | PHYSICAL PORT OR DESTINATION | PHY. ID | LOGICAL DESTINATION | PDU LENGTH | MLS TAG | PRIORITY |
|---|---|---|---|---|---|---|
| 2 BITS | 3 BITS | 1 BIT | 10 BITS | 12 BITS | 3 BITS | 1 BIT |

DU TYPES

| BITS (31..30) | TYPE | FROM | TO |
|---|---|---|---|
| 00 | EXTERNAL | HOST, PTIP, CTIP | HOST, PTIP, CTIP, PCE, CCE, KMCE |
| 01 | INTERNAL | PCE, CCE, KMCE, CC | PCE, CCE, KMCE, CC, PTIP-CONFIG, CTIP-CONFIG |
| 10 | REQUEST | PCE, CCE | PCE, CCE, KMCE, RAND, TOD/LSG |
| 11 | RESPONSE | PCE, CCE, KMCE, RAND, TOD/LDG | PCE, CCE |

PHYSICAL ID — 626

| BIT 26 | PHYSICAL ID DEFINITION |
|---|---|
| 0 | LOGICAL DESTINATION IS A PCE/CCE CHANNEL |
| 1 | LOGICAL DESTINATION IS A KMCE APPLICATION LABEL |

1 BIT

FIG. 14

LOGICAL DESTINATION — 628

| BIT 25..16 | LOGICAL DESTINATION DEFINITION |
|---|---|
| nn nnnn nnnn | PCE/CCE CHANNEL NUMBER |
| nn nnnn nnnn | KMCE APPLICATION LABEL |

10 BITS

FIG. 12

| BITS (31..30) | TYPE | BITS (29..27) | PHYSICAL PORT/DESTINATION DESCRIPTION |
|---|---|---|---|
| 00 | EXTERNAL | 000 | (RESERVED) |
| | | 001 | PT-SERIAL A |
| | | 010 | PT-SERIAL B |
| | | 011 | PT-PARALLEL |
| | | 100 | CT-SERIAL A |
| | | 101 | CT-SERIAL B |
| | | 110 | CT-PARALLEL |
| | | 111 | |
| 01 | INTERNAL | 000 | PCE, CCE, KMCE (SEE PHYSICAL ID FIELD) |
| | | 001 | CC |
| | | 010 | PT-CONFIGURE |
| | | 011 | CT-CONFIGURE |
| | | 100–111 | |
| 10 | REQUEST | 000 | PCE, CCE, KMCE (SEE PHYSICAL ID FIELD) |
| | | 001 | CC |
| | | 010–100 | |
| | | 101 | RANDOMIZER |
| | | 110 | TOD/LSG |
| | | 111 | |
| 11 | RESPONSE | 000 | NOT USED |
| | | 001 | PCE PROCESS 1 |
| | | 010 | PCE PROCESS 2 |
| | | 011 | PCE PROCESS 3 |
| | | 100 | KMCE |
| | | 101 | CCE PROCESS 1 |
| | | 110 | CCE PROCESS 2 |
| | | 111 | CCE PROCESS 3 |

FIG. 15

| LENGTH DEFINITION | |
|---|---|
| BIT 15..4 | LENGTH DEFINITION |
| nnnn nnnn nnnn | LENGTH IN DWORDS OF THE DU |

12 BITS

FIG. 16

DU PRIORITY FORMAT (634)

| PRIORITY VALUE (690) | DESCRIPTION (691) |
|---|---|
| 0 | NON REAL TIME |
| 1 | REAL TIME |

FIG. 17

COMMAND FORMAT

| BITS (31..22) (692) | 21..15 (694) | 14..12 (696) | 11..01 (608) | 0..0 (698 / 699) |
|---|---|---|---|---|
| COMMAND ID | RESPONSE | PHYSICAL SOURCE | LOGICAL SOURCE | RESERVED |

FIG. 18

CHANNEL TABLE (700)

| CHANNEL INDEX (ADDRESS) | ALLOCATED/ ACTIVITY | REQUEST SERVICE BIT | SUSPENDED CHANNEL FLAG | PROGRAM ID (ALGORITHM) | VARIABLE ADDRESS | STATE LENGTH | MLS KEY TAG |
|---|---|---|---|---|---|---|---|
| 0 (716) | | | | | | | |
| 1 | | | | | | | |
| ... | | | | | | | |
| 1023 | | | | | | | |
| | 2 BITS (702) | 1 BIT (704) | 1 BIT (706) | 3 BITS (708) | 17 BITS (710) | 5 BITS (712) | 3 BITS (714) |

METHOD AND SYSTEM FOR MANAGING DATA UNIT PROCESSING

CROSS REFERENCE TO RELATED APPLICATIONS

This application is related to the following co-pending U.S. Patent Applications:

1) U.S. patent application Ser. No. 08/841,314, filed on Apr. 30, 1997, entitled "PROGRAMMABLE CRYPTO PROCESSING SYSTEM AND METHOD";

2) U.S. patent application Ser. No. 08/904,991, filed on Aug. 1, 1997, entitled "CONFIGURABLE CRYPTOGRAPHIC PROCESSING ENGINE AND METHOD";

3) U.S. patent application Ser. No. 08/922,056, filed on Sep. 2, 1997, entitled "CRYPTOGRAPHIC PROCESSING SYSTEM WITH PROGRAMMABLE FUNCTION UNITS AND METHOD"; and 4) U.S. patent application Ser. No., 08/949,085, filed on Oct. 10, 1997, entitled "METHOD AND PROCESSING INTERFACE FOR TRANSFERRING DATA BETWEEN HOST SYSTEMS AND A PACKETIZED PROCESSING SYSTEM", which are assigned to the same assignee as the present application.

FIELD OF THE INVENTION

This invention relates in general to the field of controllers for processing systems, in particular to controllers for cryptographic processing systems.

BACKGROUND OF THE INVENTION

Trends in the communications market have clearly defined the need for security for both commercial and military markets. As communications systems become more sophisticated with complex communication services and capabilities, it is important to keep information secure. One of the problems with secure communications equipment is providing control of the system while allowing flexibility within the controlling apparatus.

Hardware implementations for controlling secure communications equipment are commonly difficult to design and expensive to manufacture. The manufacture of secure hardware often requires special semiconductor foundries which operate in an expensive, high security environment. Another problem with hardware implementations of secure communications equipment is the difficulty in reconfiguring the hardware. Typical hardware implementations are difficult to reconfigure and reprogram when equipment must perform various functional activities in a non-homogeneous communications environment.

Software implementations which control secure communications equipment are typically not considered as secure as hardware implementations because of the accessibility of the software. Another problem with software implementations is that concurrent processing of multiple programs results in performance loss due to program swapping in a secure operating system.

Typically, in existing secure systems, when a controller for a secure system is implemented as an operating system (OS), performance is degraded and re-establishment of process and data are not assured after a context switch. Additionally, most OSs for secure systems are single threaded programs which sequentially allocate computer resources from one process to another process. Context switching between programs is commonly accomplished by stopping a first process and starting a second process. To achieve adequate processing and security performance when performing a context switch, the OS must balance speed, context separation, and process separation.

Multi-tasking OSs generally provide some assurance that computer resources used by a process do not effect the operation of other programs. Memory management systems implemented in both hardware and software are typically used to isolate programs and data. However, multi-tasking OSs do not typically provide the high assurance process and data separation needed in cryptographic processing systems.

Additionally, OSs generally do not provide any method to verify the re-establishment of the context associated with a process. In cryptographic processing systems, proper re-establishment of the context for a process is essential to system security. When the context for a process is re-established incorrectly, loss or corruption of data and programs may occur thereby compromising the security of the overall system.

Thus, what is needed are an improved cryptographic controller and method suitable for use in cryptographic systems. What is also needed is a cryptographic controller and method which are programmable and capable of performing various and changeable communications functions. What is also needed is a cryptographic controller and method which provide a high security component with limited accessibility. What is also needed is a cryptographic controller and method which rapidly and securely switches programs and context for each data unit processed.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 10 illustrates a data unit header format suitable for use with the preferred embodiment of the present invention;

FIG. 11 illustrates a data unit type format suitable for use with the preferred embodiment of the present invention;

FIG. 12 illustrates a physical port and destination format suitable for use with the preferred embodiment of the present invention;

FIG. 13 illustrates a physical identification format suitable for use with the preferred embodiment of the present invention;

FIG. 14 illustrates a logical destination format suitable for use with the preferred embodiment of the present invention;

FIG. 15 illustrates a length definition format suitable for use with the preferred embodiment of the present invention;

FIG. 16 illustrates a data unit priority format suitable for use with the preferred embodiment of the present invention;

FIG. 17 illustrates a command dword format suitable for use in the preferred embodiment of the present invention; and FIG. 18 illustrates a channel table description suitable for use in the preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, an improved cryptographic controller and method. The present invention also provides a cryptographic controller and method which are programmable and capable of performing various and changeable communications functions. The present invention also provides a cryptographic controller and method which provide a high security component with limited accessibility. In the preferred embodiments, the present invention also provides a cryptographic controller and method which rapidly and securely switches programs and context for each data unit processed.

Figure 1:
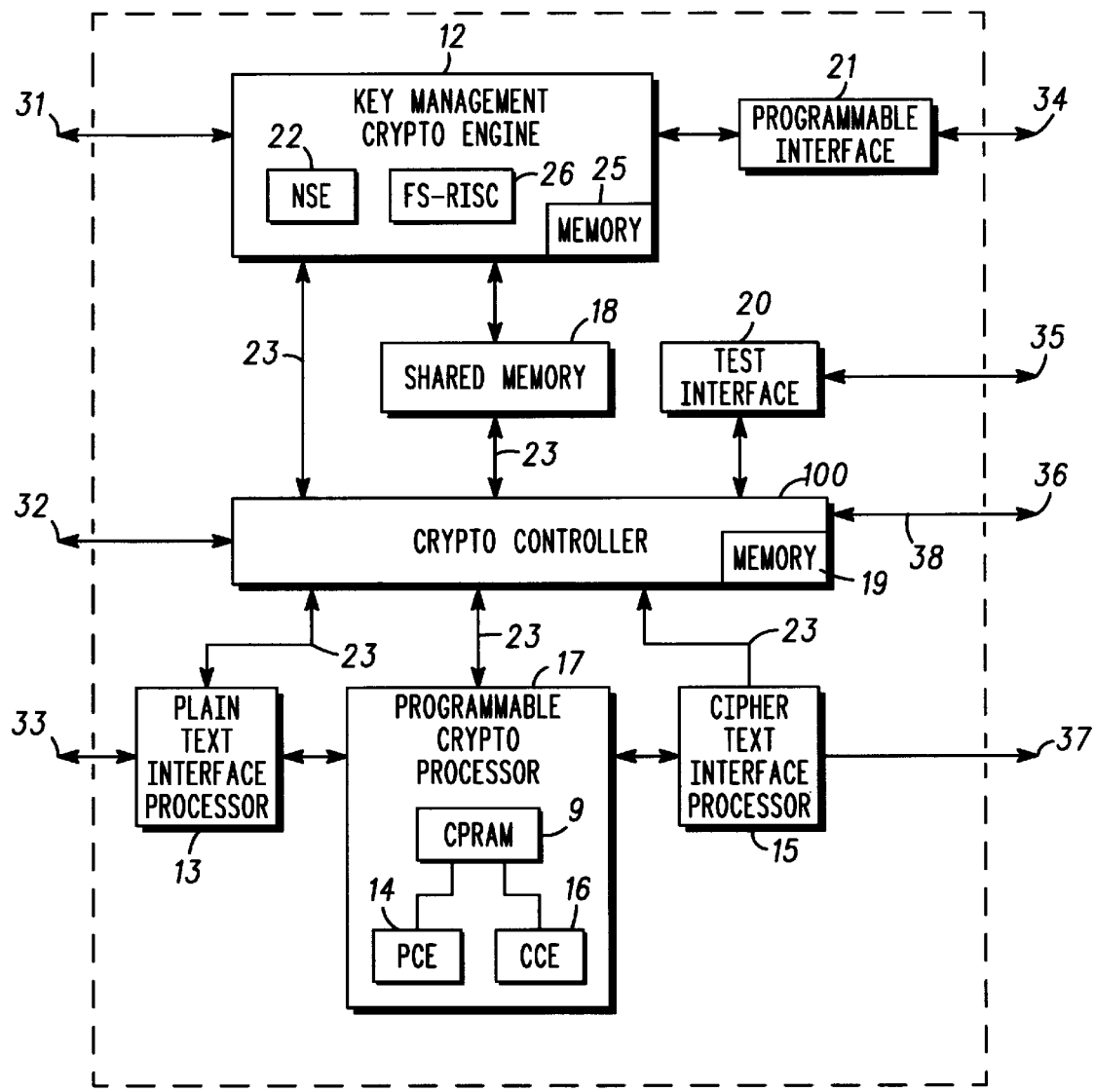
FIG. 1 illustrates a hardware block diagram of a programmable crypto processing system in accordance with a preferred embodiment of the present invention.

FIG. 1 illustrates a hardware block diagram of a programmable crypto processing system in accordance with a preferred embodiment of the present invention. Crypto processing system 10 has, in the preferred embodiment, two primary processing elements, Key management crypto engine (KMCE) 12 and programmable cryptographic processor (PCP) 17. PCP 17 comprises two processing engines, programmable cryptographic engine (PCE) 14 and configurable cryptographic engine (CCE) 16. The processing engines perform the execution of channel programs. System 10 also includes cryptographic controller (CC) 100 which performs the program management for the processing engines. System 10 also includes plain text interface processor (PTIP) 13 and cipher text interface processor (CTIP) 15 which provide external interfaces and signaling for system 10. The interface processors also provide a high performance secure flexible buffer between an external host and the internal processing systems of system 10. System 10 also includes shared memory 18 which serves as an elastic buffer between KMCE 12 and PCP 17. System 10 also includes programmable interface 21 coupled with FILL and CIK ports 34. Testing of system 10 may be performed using test interface 20 which includes on-chip emulation and JTAG ports 35.

KMCE 12 includes internal memories 25 and is coupled to CC 100 by internal bus 23. Other internal busses 23 couple PTIP 13, CTIP 15, PCP 17 and shared memory 18 to CC 100.

In the preferred embodiment KMCE 12 also contains fail-safe reduced instruction set computer (FS-RISC) 26. KMCE 12 preferably includes a second processing resource such as a 'mod N' solution extractor (NSE) 22. FS-RISC 26 is preferably comprised of dual 32 bit RISC cores, which execute an embedded secure operating system (SOS). The secure operating system provides segmentation and task management to allow tasks to be executed from a program memory external to system 10. Such tasks may include tasks and subroutines that do not perform secure processing or handle sensitive data. Tasks and subroutines that perform secure processing or handle sensitive data are preferably executed from an internal program memory (e.g., random access memory (RAM) and read-only memory (ROM)) included in memories 25.

In the preferred embodiment of the present invention, the functions performed by the FS-RISC's SOS from internal ROM include, among other things, master control of system 10, self-test and alarm monitoring of the system 10, program loading and real-time multi-level secure task management. Program loading includes loading of both secure and non-secure programs into either internal memories 25 or the loading of algorithms or programs to PCP 17.

FS-RISC 26 may also run application software from internal program memories (RAM) of memories 25. Typical application software running on FS-RISC 26 from internal program RAM includes functions such as CIK and fill-port processing for low level handling of sensitive data. Examples of this include the loading of keys. Examples of other application software running would include session key generation, by for example, public key programs and other key management and control functions. Application software may also include system management and key management functions such as loading, verifying, changing and auditing keys, and key transactions.

FS-RISC 26 may also run application software from external program memories. These external program memories may be RAM of an external host system. Such application software running from external program RAM preferably includes functions such as interface protocol processing (e.g., DS-101 and NSA 87-27), key management operations, command processing, non-secure program software and software not directly related to the handling of sensitive data.

PCP 17 is a high performance programmable superscaler cryptographic processing element which among other things, performs functions on data units and processes data units. Data units are loaded into either interface processor 13 or interface processor 15, preferably by an external host. CC 100 initiates processing of a data unit by instantiating (loading) the required context (e.g., state and variable) and program code upon reading data unit header information. Once a data unit is loaded into PCP 17 and the processing is performed and the result is written to the output interface processor. A processed data unit may alternatively be provided to another destination such as KMCE 12 for further processing.

CC 100, among other things, manages the data movement among interface processors 13 and 15 and the execution resources of crypto-engines 14 and 16, and FS-RISC 26. CC 100 operates generally as a secure real-time operating system by determining the data to move, the tasks to install in PCP 17, and when to initiate the execution of a program. CC 100 accomplishes this by examining the contents of each data unit. This is discussed in detail below. This data driven architecture provides system 10 with high performance processing capabilities. Additionally, CC 100 performs background staging. Next tasks and data units are staged during execution of present tasks. The background staging allows for the high throughput of system 10. For example, data unit transfer to PCP 17, memory cleanup and program loading for the next data unit are performed during processing of a previous data unit.

In a preferred embodiment of the present invention, PCP 17 comprises, among other elements, two high speed processing engines, PCE 14 and CCE 16, which perform functions such as channel encryption and decryption and other data processing typically performed in secure communications and signaling. In the preferred embodiment, PCE 14 performs codebook style programs while CCE 16 performs combiner style programs. PCE 14 and CCE 16 operate independently and in combination provide more than 1200 MIPs of processing for 32 bit data. In the preferred embodiments of the present invention, PCE 14 and CCE 16 are comprised of high-performance 32-bit RISC processors running at around 100 megahertz in a four stage pipeline configuration. These RISC processors, among other things, may also be used for data processing such as in-band signal processing, error detection and correction, and other protocol and format processing as defined by a channel program.

PCP 17 also includes a crypto processor RAM 9 (CPRAM) for storing channel data (e.g., programs and context) and/or data units. CC 100 downloads a program for a channel from CPRAM 9 to a memory of a processing engine prior to processing a data unit. CC 100 also downloads program context for a channel from CPRAM 9 to a memory of a processing engine prior to processing a data unit.

KMCE 12 performs, among other things, the master control functions for system 10. In the preferred embodiment, KMCE 12 contains a secure operating system (SOS) embedded in ROM within KMCE 12. In the preferred embodiment, FS-RISC 26 is a high performance 32 bit RISC processor. In addition to FS-RISC 26, KMCE 12 preferably includes a math coprocessor suitable for public key program processing. In this embodiment, KMCE 12 provides approximately 150 MIPs of processing capability to allow the execution of multiple channel and single channel applications.

In other embodiments, system 10 may serve as an embedded cryptographic processing element for a variety of applications. For example, system 10 may allow data flow through architectures or coprocessor architectures to be implemented. In the data flow through architecture, data may flow from plain text interface port 33 to cipher text interface port 37 or vice versa. The internal security mechanisms embodied in system 10 help isolate the logically different data types such as the sensitive plain text data and variables from the protected cipher text data. In the coprocessor architecture implementation, a host system for example, desirably provides greater design assurance for isolating the types data.

In the preferred embodiments of system 10, PTIP 13 and CTIP 15 include 8-bit, 16-bit and 32-bit parallel data interfaces at ports 33 and 37 with FIFO control structures. Interface processors 13 and 15 also preferably include serial asynchronous and serial synchronous interfaces. PTIP 13 and CTIP 15 include internal processors, internal physical memory and external memory expansion capability. The memories of the interface processors are managed by their internal processors. In the preferred embodiment, the interface processors are capable of full duplex operation and provide full physical data interface isolation for processing plain-text and cipher-text data.

Interface ports 31 are associated with KMCE 12, and preferably includes ports for memory interface, configuration signals, system clock and interrupts. In the preferred embodiment, the memory interface port is comprised of a 33 bit data bus, a 24 bit address bus and a control interface for accessing internal memory or I/O devices. In the preferred embodiment of system 10, KMCE 12 receives commands and data through either PTIP 13 or CTIP 15. Other embodiments allow control and data to come from interface port 31.

System 10 also includes external context memory bus 38 (CNTX) which connects to external context port 36. In the preferred embodiment, external context memory bus 38 is comprised of a 33-bit data bus and an address control bus which are used to couple to an external context memory. External context memory is preferably an extension of CPRAM and may be used to store data units, context, and programs. CC 100 manages the swapping of context from an active task in PCP 17 to an inactive task in the external context memory or CPRAM. Bus 38 allows for high speed context changes for applications require context and/or programs which may reside in external memory. Port 32 provides an interface to CC 100 for control signals and discrete alarms signals.

Context, as used herein, includes, for example, information associated with a specific channel and may include state or variable information, keys and function information associated with channels.

In the preferred embodiments, the cryptographic processing system of the present invention is embodied in an ultra large scale integrated (ULSI) device, preferably on a single silicon die. In the preferred embodiment, several processing subsystems are integrated into the ULSI result in approximately 1350 MIPs of processing capability suitable for a wide variety of cryptographic program classes.

Figure 2:
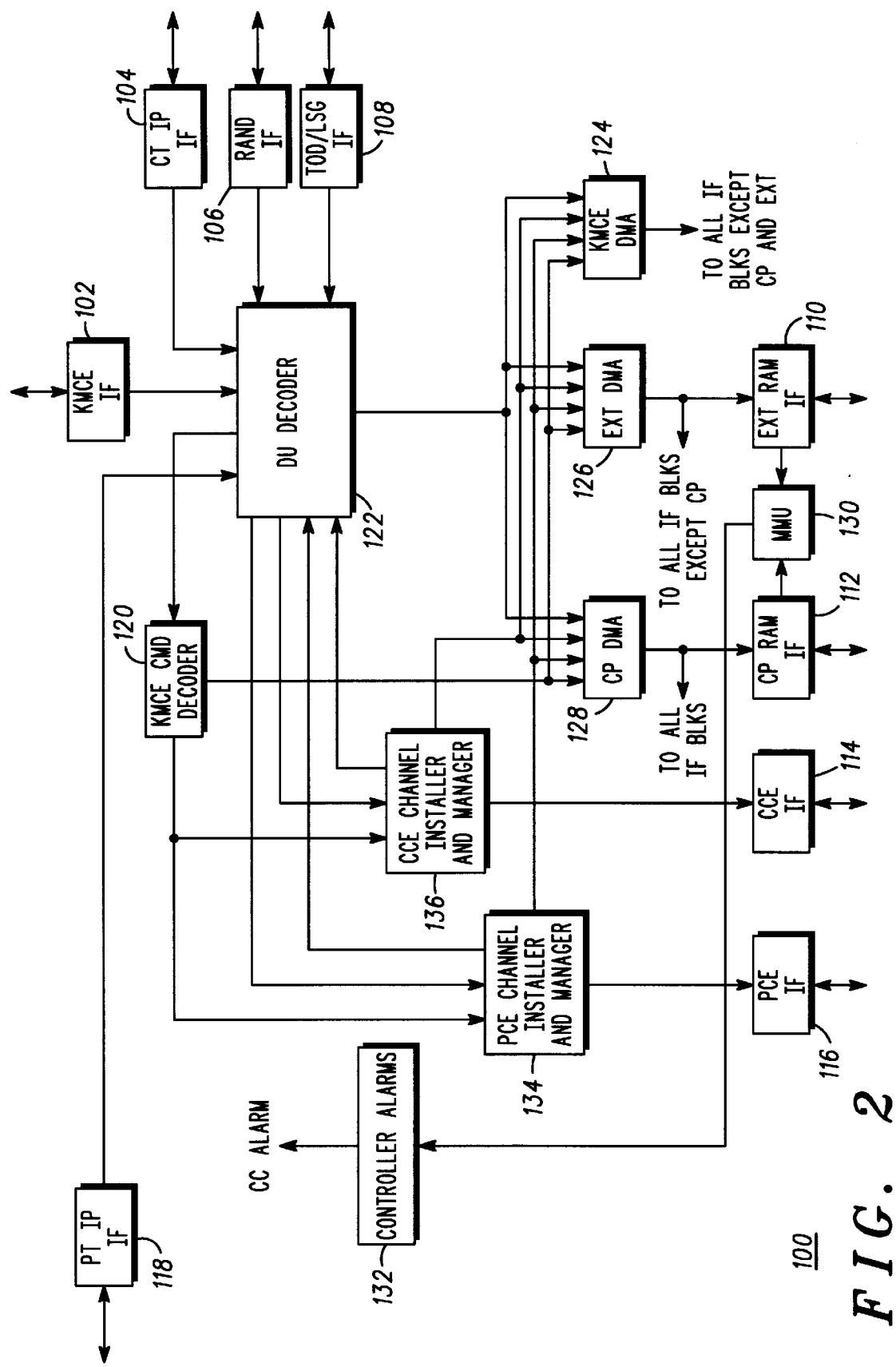
FIG. 2 and illustrates a hardware block diagram of a cryptographic controller in accordance with a preferred embodiment of the present invention.

FIG. 2 illustrates a hardware block diagram of a cryptographic controller in accordance with a preferred embodiment of the present invention. Cryptographic controller (CC) 100 has, in the preferred embodiment, at least one primary processing element, data unit (DU) decoder 122. DU decoder 122 is a finite state machine (FSM) which decodes the header of a data unit (e.g., pre-formatted data) to determine which control operation to perform. A control operation may be, for example, an operation to assign moving a data unit to a direct memory access (DMA) unit such as cryptographic processor RAM DMA (CPDMA) 128, external context RAM DMA (EXTDMA) 126, or key management crypto engine DMA (KMCEDMA) 124, each of which is coupled to DU decode 122.

Another CC 100 control operation may be, for example, to store a data unit for processing in an external cryptographic processing engine. When CC 100 stages a data unit, the proper channel (e.g., program and context information for performing transformations on a data unit) is first installed in the external cryptographic processing engine. CC 100 first delegates the installation and management of the channel to a channel install and management element such as programmable cryptographic engine channel installer and manager (PCECIM) 134 or configurable cryptographic engine channel installer and manager (CCECIM) 136. In the preferred embodiment, an example of a channel which may be delegated to PCECIM 134 or CCECIM 136 for installation and management is a cryptographic algorithm used for encryption of data. When CC 100 delegates the installation and management of a channel, a FSM in the channel install and management element (e.g., PCECIM 134 or CCECIM 136) preferably controls the shadow channel setup procedure (discussed below) of the channel. When the data unit, program, and context information have been loaded by the shadow channel setup procedure, and the external cryptographic processing engine is available, the FSM of the channel install and management element starts and controls the processing of the data unit.

CPDMA 128, EXTDMA 126, and KMCEDMA 124 are each DMA units which preferably control movement of data units, programs, and context information (e.g., data). CPDMA 128 is assigned a data movement task by CC 100 when data is sent to and received from (exchange) an external memory source titled cryptographic processor random access memory (CPRAM). In the preferred embodiment, CPDMA 128 may exchange data with CPRAM via any interface within CC 100. Examples of interfaces available to CPDMA 128, EXTDMA 126, and KMCEDMA 124 are plain text interface processor interface (PTIPIF) 118, cipher text interface processor interface (CTIPIF) 104, key management cryptographic engine interface (KMCEIF) 102, randomizer interface (RIF) 106, time-of-day and linear sequence generator interface (TODLSGIF) 108, external random access memory interface (XRAMIF) 110, cryptographic processor random access memory interface (CPRAMIF) 112, configurable cryptographic engine interface (CCEIF) 114, and programmable cryptographic engine interface (PCEIF) 116.

EXTDMA 126 is assigned a data movement task by CC 100 when data is exchanged with an external memory source which is titled external random access memory (EXTRAM). EXTDMA 126 may exchange data via any interface within CC 100. In the preferred embodiment, EXTDMA 126 does not exchange data with CPRAM.

KMCEDMA 124 is assigned a data movement task by CC 100 when data is exchanged with an external memory source titled shared memory such as shared memory 18 (FIG. 1). Preferably, shared memory performs as a data buffer between an external processing element titled key management cryptographic engine (KMCE) and CC 100. KMCEDMA 124 may exchange data via any interface within CC 100. In the preferred embodiment, KMCEDMA 124 does not exchange data with CPRAM and EXTRAM In the preferred embodiment, CPDMA 128, EXTDMA 126, and KMCEDMA 124 are each implemented as a FSM and are therefore capable of high throughput when exchanging data with elements external to CC 100.

Memory management unit (MMU) 130 is coupled to CPRAMIF 112, XRAMIF 110, and controller alarm element (CA) 132. MMU 130 indirectly receives decoded commands from KMCE command decoder 120 to setup security properties within MMU 130. For example, when two or more channels are scheduled to perform cryptographic operations on separate data units, each program is assigned a separate and distinct memory address range for accessing the data unit in CPRAM or external context RAM. Preferably, MMU 130 monitors the addressing of each assigned portion of memory to verify access privileges of the channels.

KMCE command decoder (KMCECD) 120 is coupled to PCECIM 134, CCECIM 136, CPDMA 128, and DU decoder 122. KMCECD 120 receives commands indirectly from KMCE 12 (FIG. 1). Among other things, KMCECMD 120 decodes KMCE 12 (FIG. 1) commands to create and destroy channels used for cryptographic processing within PCE 14 (FIG. 1) and CCE 16 (FIG. 1). Creating a channel for cryptographic processing within PCE 14 (FIG. 1) may include, for example, setting an address range in memory (e.g., CPRAM and EXTRAM) to be monitored by MMU 130 and initiating background staging of a program and context which determines the type of processing performed by the channel.

Controller alarm element (CA) 132 is coupled to MMU 130. Among other things, CA accepts signals which represent out-of-bounds memory addressing. Out-of-bounds memory addressing is when, for example, a cryptographic engine (e.g., PCE 14 and CCE 16 (FIG. 1)) requests access into a memory address space which is outside the memory address space assigned to the engine. In another embodiment, CA 132 also accepts a "zeroize" command from a source which is outside CC 100. For example, KMCE 12 (FIG. 1) may request a reset of all decoders, installers and managers, and memories which are addressable within CC 100 based on an alarm condition sent from MMU 130 to CA 132.

Figure 3:
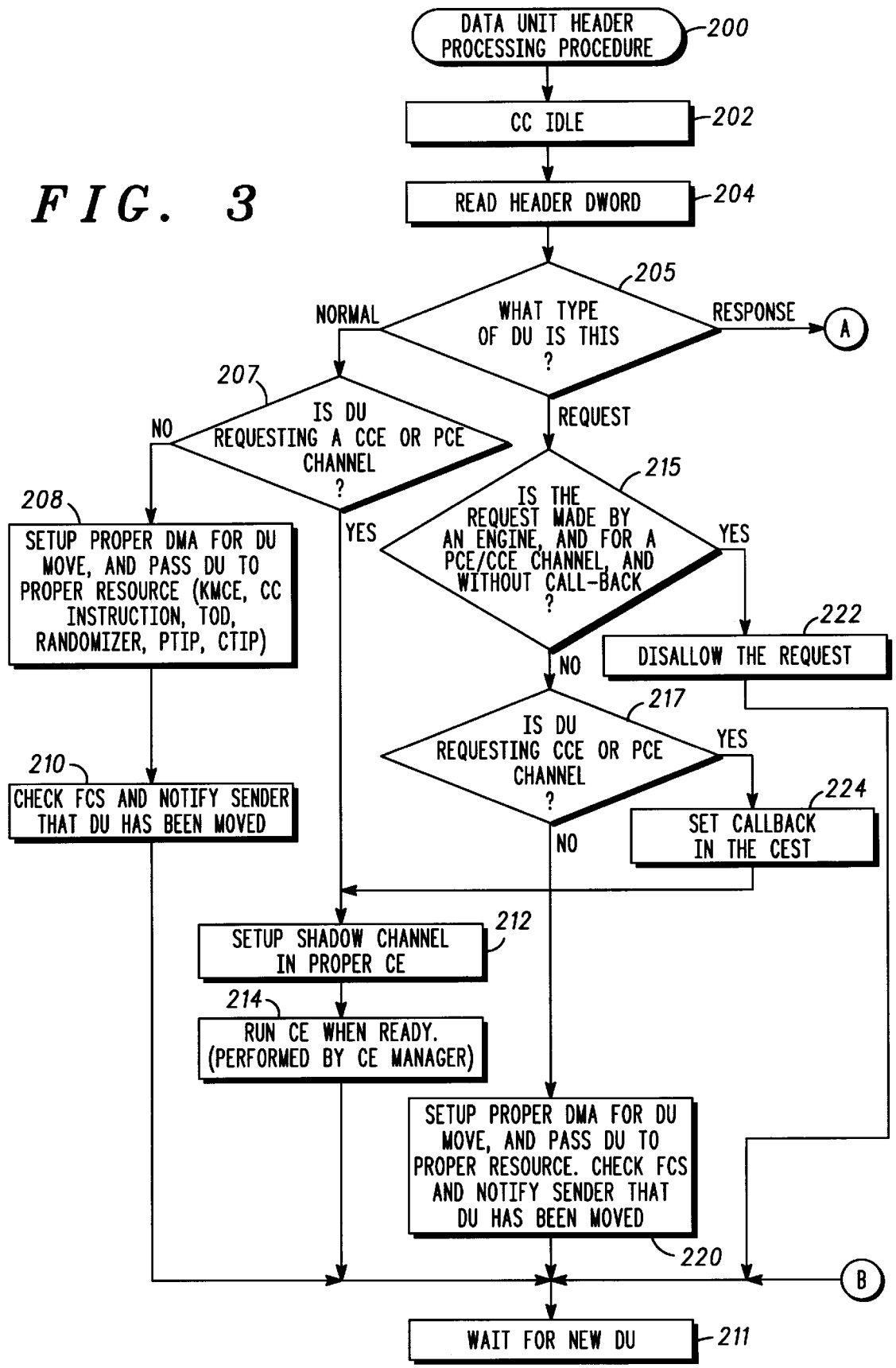
FIG. 3 and FIG. 4 are a flow chart of a data unit header processing procedure in accordance with a preferred embodiment of the present invention.
Figure 4:
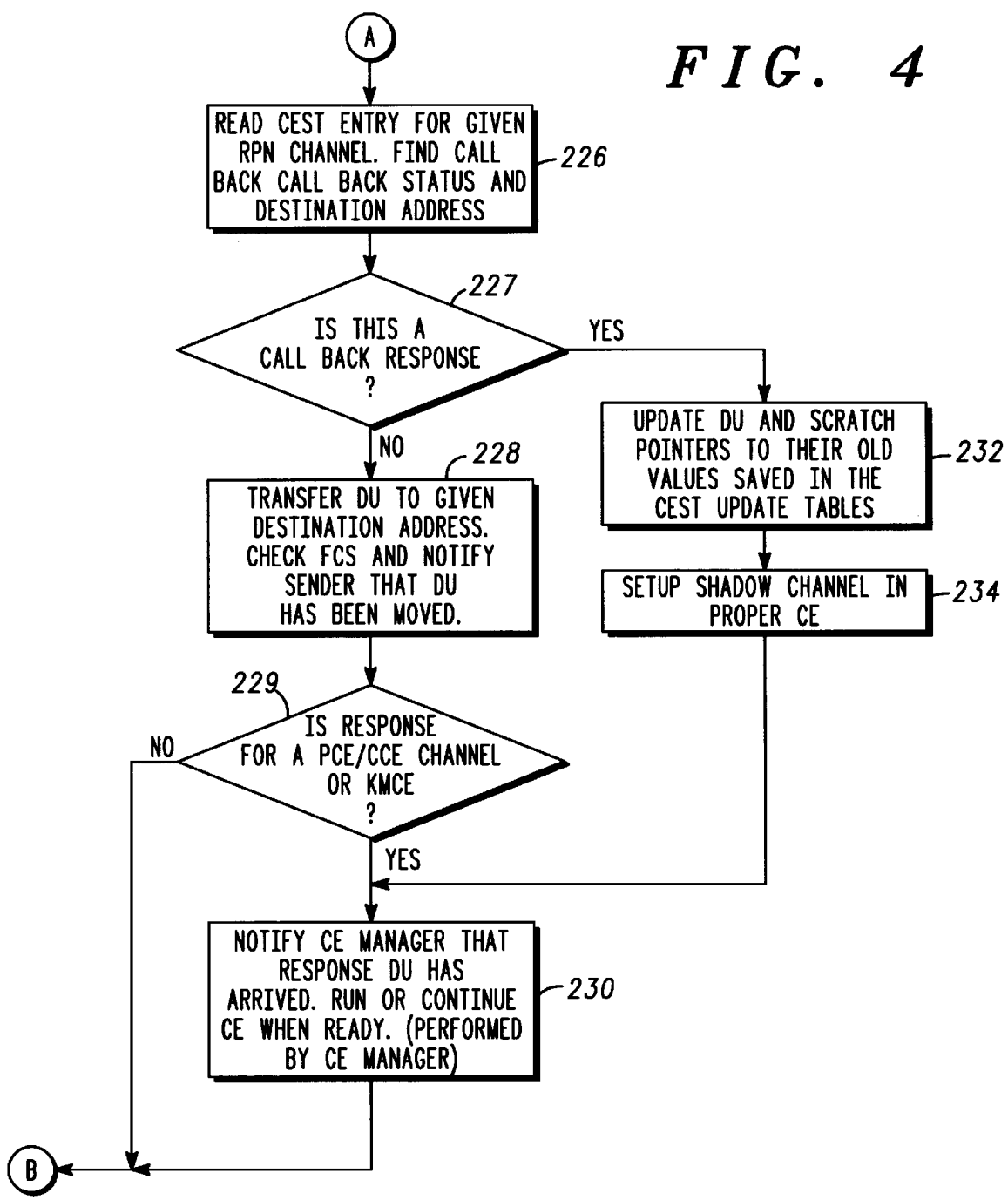

FIG. 3 and FIG. 4 are a flow chart of a data unit header processing procedure in accordance with a preferred embodiment of the present invention. Data unit header processing procedure 200 (FIG. 3 AND FIG. 4) is a procedure for processing a header (described below) of a data unit. Among other things, a header for a data unit is used to determine the type of data unit processing which is managed by CC 100 (FIG. 1). In the preferred embodiment, procedure 200 is performed by a combination of DU decoder 122 and DMA units (e.g., CPDMA 128, EXTDMA 126, and KMCEDMA 124) all of FIG. 2.

In task 202, the CC is idle. In the preferred embodiment, the FSM for the DU decoder 122 of the CC is in an idle state. More specifically, when there are no headers from data units to process, task 202 waits for headers of data units to arrive for processing. When a header from a data unit is ready to be processed, task 204 is performed.

In task 204, a header dword (e.g., the first 32-bits of data) is read from an external source. In the preferred embodiment, a header dword may be read from an external memory (e.g., CPRAM 9 (FIG. 1)) or processor (e.g., PTIP 13 and CTIP 15 (FIG. 1)).

In task 205, the type of data unit is determined. In the preferred embodiment, the header dword read in task 204 is decomposed to determine the type of data unit. When the type of data unit is "normal", task 207 is performed. A normal type of data unit is preferably a data unit which is not created because of the processing of a previous data unit. When the type of data unit is "request", task 215 is performed. A request type of data unit is a data unit which is created because the processing of a normal type data unit within a crypto engine (e.g., PCE 14 and CCE 16 (FIG. 1)) "request"ed service from another crypto engine or external process in order to complete processing of the normal type data unit. When the type of data unit is "response", task 226 is performed. In the preferred embodiment, a response type data unit is a data unit created as a response to a request type data unit.

In task 207, a check is performed to determine when the data unit is requesting a crypto engine (e.g., PCE 14 and CCE 16 (FIG. 1)) channel. In the preferred embodiment, the header dword read in task 204 is decomposed to determine the channel index for the data unit. When the channel index refers to a crypto engine (e.g., CCE 16 and PCE 14 (FIG. 1)), channel index in the channel table (discussed below), task 212 is performed. When the channel index is undefined, task 208 is performed.

In task 208, a DMA unit (e.g., CPDMA 128, EXTDMA 126, and KMCEDMA 124 (FIG. 2)) sets up and moves the data unit to the proper resource. In the preferred embodiment, the DMA unit moves a data unit to a destination which is determined from the header of the data unit. A destination may be, for example, KMCE 12 (FIG. 1), PTIP 13 (FIG. 1), etc.

In task 210, a frame check sequence (FCS) is performed on the data unit and the sender of the data unit is notified. In task 210, the DU decoder notifies the sender of the data unit that the data unit was moved. When the notification to the sender is complete, task 211 is performed.

In task 211, the DU decoder waits for a new data unit to process. In the preferred embodiment, when any external element (e.g., KMCE 12, PCE 14, CCE 16, PTIP 13, CTIP 15, etc. (FIG. 1)) notifies the DU decoder that a new data unit is ready for processing, the DU decoder performs task 204 on the header of the new data unit.

In task 212, a shadow channel setup procedure is performed. In the preferred embodiment, the shadow channel setup procedure configures a processing engine (e.g., PCE 14 and CCE 16 (FIG. 1)) for processing data units. A suitable shadow channel setup procedure for task 212 is shown below in FIG. 5 AND FIG. 6.

In task 214, a run signal is provided to the processing engine configured in task 212. In the preferred embodiment, the header of the data unit indicates which external processing engine is signaled to begin processing. Preferably, the processing engine indicated in the header is signaled to begin processing. When task 214 is complete, task 211 is performed.

In task 215, when the data unit is a "request" type, a check is performed to determine when the request is valid. When a data unit having an invalid request is provided, task 222 is performed. When a data unit having a valid request is provided, task 217 is performed. In the preferred embodiment, the validity of a request is determined by the DU decoder. Preferably, the DU decoder first verifies that the creator of the request type data unit is a crypto engine. When the DU decoder recognizes that the request type data unit was created by a crypto engine (e.g., PCE 14 and CCE 16), a "callback signal" from the crypto engine is then checked by the DU decoder. When the callback signal from the crypto engine is asserted, the request type data unit is accepted by the DU decoder as valid.

In task 217, a check for a channel is performed. In the preferred embodiment, the logical destination in the header of the data unit is checked to determine when a channel is provided. When a channel is provided in the logical destination, task 212 is performed. When no channel is provided in the logical destination, task 220 is performed.

In task 220, processing similar to task 208 and 210 is performed. Also similar to task 210, when task 220 is complete, task 211 is performed.

In task 222, the request for service is disallowed. In the preferred embodiment, when task 222 is complete, task 211 is performed.

In task 226, the cryptographic engine state table (CEST) is read by the DU decoder to determine a requesting process number (RPN) channel. In the preferred embodiment, a CEST identifies which data units, channel programs, and channel contexts are currently assigned to each processing engine (e.g., PCE 14 and CCE 16 (FIG. 1)). Preferably, four separate CESTs are stored and managed. Two redundant CESTs are stored and managed for each processing engine. Among other things, each CEST contains status information representing the data unit length, a pointer to the data unit location, channel number, a pointer to a first or second channel program, a pointer to a first or second channel program context, a pointer to a scratch memory location for saving various processing results.

In task 227, the header of the data unit is checked to determine when response is a call-back. In the preferred embodiment, when the response is not a call-back, task 228 is performed. When the response is a call-back, task 232 is performed.

In task 228, the data unit is transferred to the element determined by the destination address in the header of the data unit. In the preferred embodiment, the range of destination addresses are shown in a later figure. Additionally, task 228 performs a FCS and a move of the data unit. When the move of the data unit is complete, the CC signals the sender the move is complete.

In task 229, the response type is checked for a PCE or CCE channel or a KMCE. In the preferred embodiment, the physical identification field of the header for the data unit is decomposed to determine the type of response type. When the response type is determined as a cryptographic engine type (e.g., PCE or CCE), task 230 is performed. When the response type is determined as KMCE type, task 211 is performed.

In task 230, the cryptographic engine manager (e.g., PCECIM or CCECIM (FIG. 2)) is notified when response processing for a data unit is complete. In the preferred embodiment, when task 230 is complete, task 211 is performed.

In task 232, the data unit pointer and scratch pointer are updated. In the preferred embodiment, the pointers are updated to the existing values in the CEST.

In task 234, a setup shadow channel in crypto engine process is performed. In the preferred embodiment, processing similar to task 212 is performed. When task 234 is complete, task 230 is performed.

Figure 5:
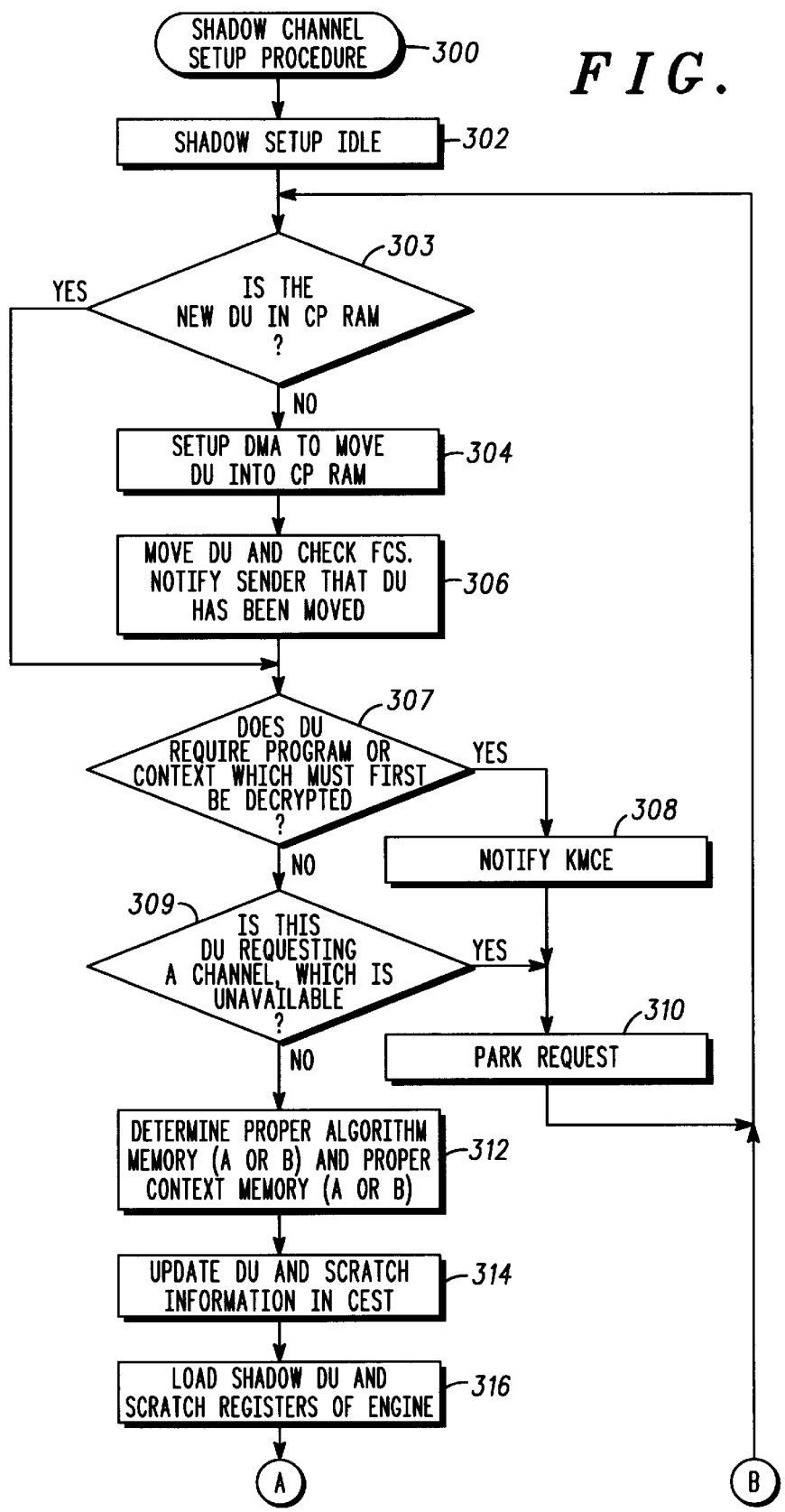
FIG. 5 and FIG. 6 are a flow chart of a shadow channel setup procedure in accordance with a preferred embodiment of the present invention.
Figure 6:
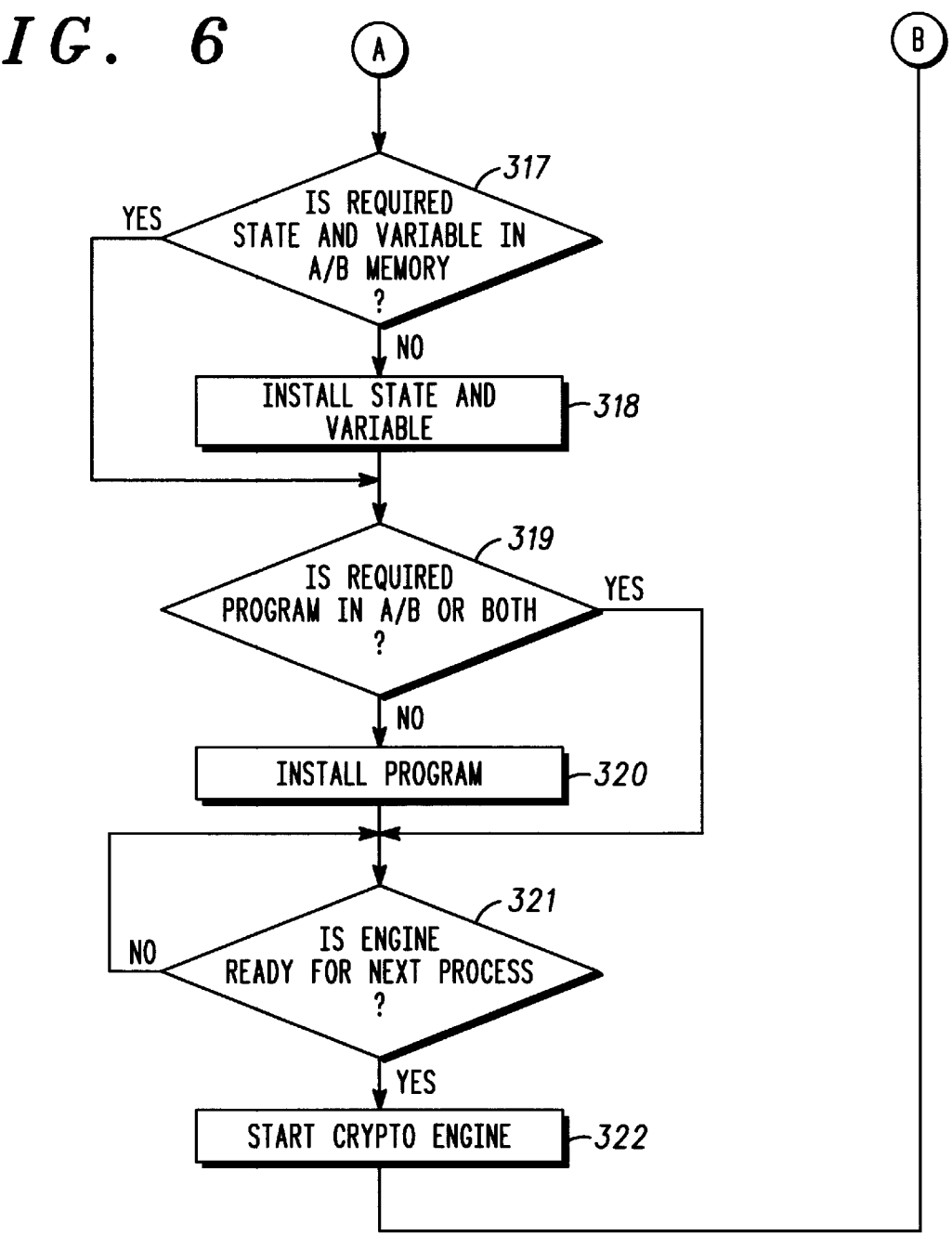

FIG. 5 and FIG. 6 are a flow chart of a shadow channel setup procedure in accordance with a preferred embodiment of the present invention. Shadow channel setup procedure 300 (FIG. 5 and FIG. 6) is a procedure where a data unit and a program are setup and configured for a processing engine (e.g., PCE 14 and CCE 16 (FIG. 1)) to process. In the preferred embodiment, procedure 300 is performed by the installer and manager (e.g., PCE channel installer and manager 134 or CCE channel installer and manager 136 (FIG. 2)).

In task 302, procedure 300 is idle. In the preferred embodiment, procedure 300 is idle when the installer and manager is idle.

In task 303, a check is performed to determine when the data unit is in CPRAM. In the preferred embodiment, the installer and manager is started by the DU decoder when a data unit requires processing by a channel. The installer and manager determines when a new data unit is in local memory (e.g., CPRAM 9 (FIG. 1) and EXTRAM). When a data unit is in local memory, task 307 is performed. When a data unit is not in local memory, task 304 is performed.

In task 304, the installer and manager issues control signals to set up a DMA unit (e.g., CPDMA 128) to move the data unit from external memory into local memory.

In task 306, the DMA unit moves the data unit from external memory into local memory and notifies the sender of the move. When the move is complete, the DMA unit computes a FCS for the data unit and verifies the computed FCS is the same as the FCS which is included in the data unit. When the FCSs are the same, processing on the data unit continues. Otherwise, the data unit is discarded.

In task 307, a check is performed to determine when the program and/or context are to be decrypted. In the preferred embodiment, when the data unit contains program and/or context which are to be decrypted, task 308 is performed. Otherwise, task 309 is performed.

In task 308, the installer and manager notifies the KMCE. In the preferred embodiment, the installer and manager sends a signal to the KMCE requesting a decryption service to support the decryption request in task 307. When task 308 is complete, task 310 is performed.

In task 309, a check is performed to determine when the requested channel is available. In the preferred embodiment, when, on behalf the data unit, the installer and manager requests a channel resource which is unavailable, task 310 is performed. When the resource is available, task 312 is performed.

In task 310, a request for service is parked. When the request for service is parked, task 303 is performed. In the preferred embodiment, "parking" a request is when the request is placed on hold because resources needed to satisfy the request are unavailable. For example, when a program, context, or both need decryption services, the resources (e.g., KMCE 12 (FIG. 1)) may not be available. When the resource providing the requested service is unavailable, the request for service is parked. Preferably, parking a request includes storing the APDU which needs service in a memory (e.g., CPRAM 9 (FIG. 1)) and saving the header and address pointer of the APDU in a register in the installer and manager.

In task 312, the proper algorithm (program) and context memory are determined. In the preferred embodiment, the installer and manager determines the memory (e.g., which memory is active, and which is shadow) within the PCE or CCE to assign the program and context.

In task 314, the data unit and scratch information is updated in the CEST. In the preferred embodiment, the installer and manager updates the data unit and scratch information in the CEST.

In task 316, the shadow data unit and scratch registers in the crypto engine are loaded. In the preferred embodiment, the installer and manager loads the shadow data unit and scratch registers of the target processing engine (e.g., PCE or CCE) with the status information for processing the data unit. In the preferred embodiment, the status information includes, for example, the address in memory (e.g., CPRAM) where that data unit is located. Additionally, status information includes which context memory for the processing engine is shadow and which is active.

In task 317, the installer and manager checks the CEST to determine when the necessary state and variable (context) are loaded in the shadow memory for the target processing engine (e.g., PCE or CCE). When the context is loaded in the shadow memory, task 319 is performed. Otherwise, task 318 is performed.

In task 318, the installer and manager loads the state and variable (context) associated with the channel in the shadow memory of the target processing engine.

In task 319, the installer and manager checks the CEST to determine when the necessary program is loaded in the program memory associated with the target processing engine. When the program is not loaded into the program memory, task 320 is performed. Otherwise, task 321 is performed.

In task 320, the channel installer and manager (e.g., PCE or CCE channel installer and manager) signals a DMA unit (e.g., CPDMA, EXTDMA, KMCEDMA) to load the program into the program memory associated with the target processing engine.

In task 321, the installer and manager checks the availability of the processing engine. When the processing engine is unavailable for processing, task 321 is performed. Otherwise, task 322 is performed.

In task 322, the installer and manager starts the crypto engine (e.g., PCE or CCE) then starts the channel installer and manager. When task 322 is complete, task 303 is performed.

Figure 7:
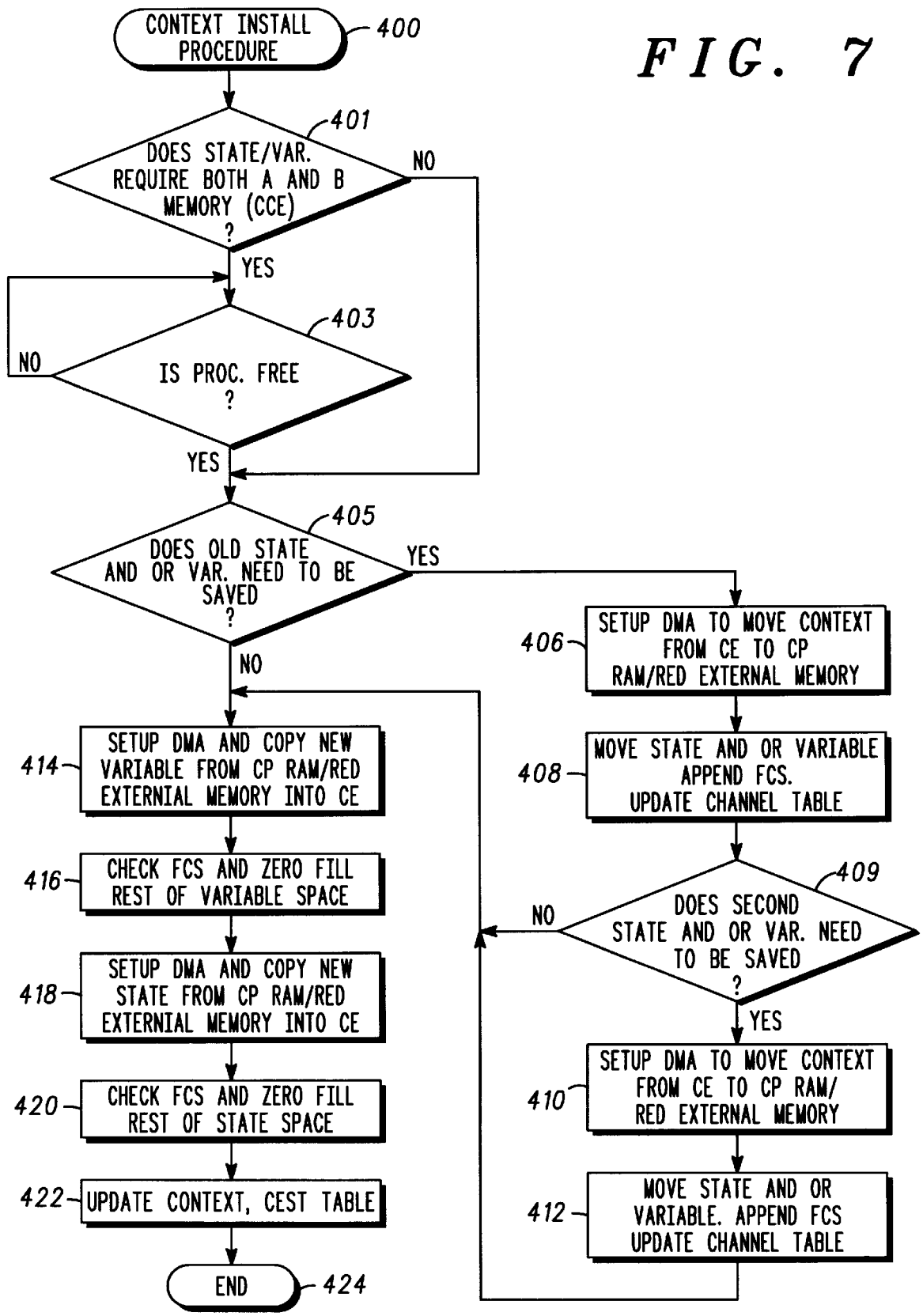
FIG. 7 is a flow chart of a context install procedure in accordance with a preferred embodiment of the present invention.

FIG. 7 is a flow chart of a context install procedure in accordance with a preferred embodiment of the present invention. Context install procedure 400 (FIG. 7) is a procedure to install the context associated with a channel. In the preferred embodiment, the installer and manager (e.g., PCE channel installer and manager 134 or CCE channel installer and manager 136 (FIG. 2)) performs procedure 400 in accordance with installing the context for a processing engine (e.g., PCE 14 and CCE 16 (FIG. 1)).

In task 401, a check is performed to determine when the state and variable need the active and shadow memory. In the preferred embodiment, the installer and manager determines when, because of data size, the state and variable (context) requires both the active and shadow context memories in the processing engine. When both memories are required task 403 is performed. Otherwise, task 405 is performed.

In task 403, a check to determine when the processing engine is free is performed. In the preferred embodiment, the installer and manager determines when the processing engine is available for processing. When the processing engine is available, task 405 is performed. Otherwise, task 403 is performed.

In task 405, a check is performed to determine when the state and variable need to be saved. In the preferred embodiment, the installer and manager determines when the state and variable (context) of the exiting channel (e.g., the channel being swapped out of processing) are to be restored. When the exiting channel context is to be restored, task 406 is performed. Otherwise, task 414 is performed.

In task 406, the DMA unit is setup to move the context from the crypto engine to the crypto processor RAM or external memory. In the preferred embodiment, the channel installer and manager signals CPDMA or EXTDMA to move the exiting context from the memory of the processing engine to CPRAM or EXTRAM.

In task 408, the state and variable are moved, an FCS is appended to the data unit, and the channel table is updated. In the preferred embodiment, CPDMA or EXTDMA moves the exiting context from the memory of the processing engine to CPRAM or EXTRAM. The channel installer and manager performs a FCS on the exiting data unit and updates the channel table pointers to the context information in CPRAM.

In task 409, a check is performed by channel installer and manager on the exiting data unit to determine when a second context is to be saved to CPRAM. When a second exiting context save is needed, task 410 is performed. Otherwise, task 414 is performed.

In task 410, the channel installer and manager signals CPDMA or EXTDMA to move the second exiting context from the memory of the processing engine to CPRAM or EXTDMA.

In task 412, CPDMA or EXTDMA moves the exiting context from the memory of the processing engine to CPRAM or EXTRAM. The channel installer and manager performs a FCS on the exiting data unit and updates the channel table pointers to the context information in CPRAM.

In task 414, the channel installer and manager sets up and signals CPDMA or EXTDMA to move the entering variable from CPRAM or EXTRAM to the memory of the processing engine. CPDMA or EXTRAM moves the entering variable from CPRAM or EXTRAM to the memory of the processing engine.

In task 416, the channel installer and manager performs a FCS on the entering variable and performs a zero fill on the unused shadow variable memory of the processing engine. Zero fill of unused memory is a security process for removing data associated with a channel; thereby, providing channel separation.

In task 418, the channel installer and manager signals CPDMA or EXTDMA to move the entering state from CPRAM or EXTRAM to the memory of the processing engine. CPDMA or EXTDMA moves the entering state from CPRAM or EXTRAM to the memory of the processing engine.

In task 420, the channel installer and manager performs a FCS on the entering state and performs a zero fill on the unused shadow state memory of the processing engine. The FCS integrity check is a security feature which provides assurance of properly reloading the state.

In task 422, the state and variable information (context) are updated in the CEST.

Figures 8, 9:
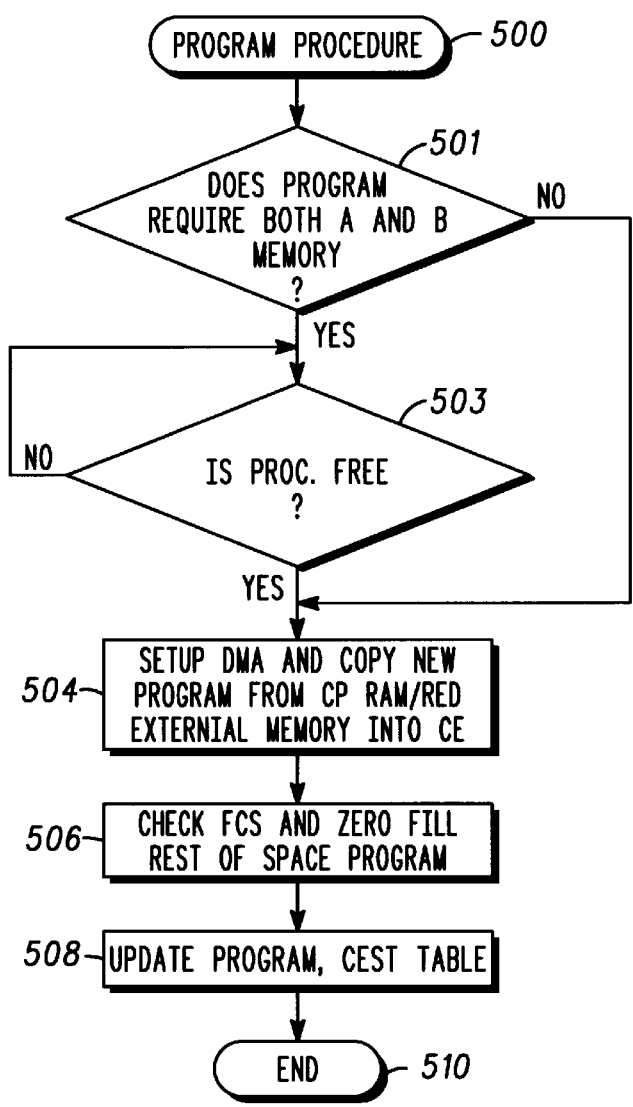
FIG. 8 is a flow chart of a channel program install procedure in accordance with a preferred embodiment of the present invention.
FIG. 9 illustrates a data unit format suitable for use with the preferred embodiment of the present invention.

FIG. 8 is a flow chart of a program install procedure in accordance with a preferred embodiment of the present invention. Program install procedure 500 (FIG. 8) is a procedure to install the program associated with a channel. In the preferred embodiment, the installer and manager (e.g., PCE channel installer and manager 134 or CCE channel installer and manager 136 (FIG. 2)) performs procedure 500 in accordance with installing a program which is executed by a processing engine (e.g., PCE 14 and CCE 16). In the preferred embodiment, many (e.g., tens, hundreds, or more) channels and programs can be concurrently operating.

In task 501, a check is performed to determine when the program needs both active and shadow memories. In the preferred embodiment, the channel installer and manager determines when, because of program size, the program is loaded into the shadow and active program memories for the processing engine. When the program is loaded into shadow and active program memories in the processing engine, task 503 is performed. Otherwise, task 504 is performed.

In task 503, a check is performed to determine when a processing engine is free. In the preferred embodiment, when the processing engine is available to perform the program, task 504 is performed. Otherwise, task 503 is performed.

In task 504, the channel installer and manager sets up and signals a DMA unit (e.g. CPDMA and EXTDMA) to move the program from EXTRAM to the program memory associated with the processing engine. The DMA unit moves the program from the EXTRAM or CPRAM to the program memory associated with the processing engine.

In task 506, the channel installer and manager performs a FCS on the program and performs a zero fill on the unused shadow program memory of the processing engine.

In task 508, the program information (e.g., which crypto engine program memory is active and which is shadow) is updated in the CEST.

FIG. 9 illustrates a data unit format suitable for use with the preferred embodiment of the present invention. A data unit in APDU format is illustrated in FIG. 9. A data unit in APDU format is comprised of a series of dwords. Each dword has an offset shown in column 602. The first dword is data unit header dword 606 which is preferably a 32 bit dword. Data unit header dword 606 is followed by command dword 608, having a dword offset of one. Following command dword 608 is parameter data field 610 having dword offsets between 2 and 4094. Parameter data field 610 of an APDU contains the application payload. The data in field 610 may have a different format for each channel since an application program can context swap for each data unit. For example, when multiple programs are executing in system 10 (FIG. 1) for multiple channels, some channels may need more robust protocols to assure lock step processing for a communication thread.

The final dword is frame check sequence dword 612, which is preferably a 32-bit FCS which is calculated over an entire APDU. FCS dword 612 is an optional field that may be enabled or disabled for a specific application. During the startup procedure, KMCE 12 (FIG. 1) configures CC 100 (FIG. 1) and determines whether or not check sums are appended to each APDU.

One suitable FCS program is a 32-bit version of the ISO 3309-1964 E specification. This specification defines high level data link control procedures and frame structure for information processing systems and data communications.

FIG. 10 illustrates a data unit header format suitable for use with the preferred embodiment of the present invention. The data unit header format defines the size and location of the fields in channel header dword 606. Channel header dword 606 includes APDU type field 622 of 2 bits, physical port or destination 624 of 3 bits, physical id 626 of 1 bit, logical destination 628 of 10 bits, PDU length field 630 of 12 bits, MLS tag field 632 of 3 bits, and priority bit 634. In the preferred embodiment, priority bit field 634 is optional.

APDU type field 622, physical port or destination 624, physical id 626, logical destination 628, PDU length field 630, priority bit field 634 are each discussed below.

MLS tag field 632 specifies the security level of the APDU. In the preferred embodiment, the value in MLS tag field 632 is compared to the value of a MLS tag of a key associated with the channel. When the two tags do not match, the data unit is rejected and an error condition is set. In the preferred embodiment of the present invention, the MLS tag for the key is either loaded with the key or specified at the time of key creation. The MLS tag key is preferably based on a security level used to create the key.

FIG. 11 illustrates a data unit type format suitable for use with the preferred embodiment of the present invention. In the preferred embodiment, APDU type field 622 defines a value for the data unit type and its corresponding significance. Preferably, APDU type field 622 defines the source of the APDU, for example, from the PTIP 13 or CTIP 15, or from another internal source of system 10. APDU type field 622 preferably indicates the output processor which is to receive the data unit.

APDU type field 622 also specifies whether the APDU is a request or response APDU. CC 100 uses APDU type field 622 to, among other things, determine the use of physical port or destination 624. An example of a preferred mapping of type of APDU and the data unit "from" and data unit "to" locations is provided in FIG. 11. FIG. 11 shows a mapping of APDU type bits 644 mapping to APDU type 646. Each APDU type shows APDU from 648 mapping to APDU to 650 locations.

FIG. 12 illustrates a physical port and destination format suitable for use with the preferred embodiment of the present invention. In the preferred embodiment, physical port or destination 624 defines the physical port or destination for each type of APDU. Physical port or destination 624 is re-mapped for each type of APDU. When the type of APDU is a "response", physical port or destination 624 contains a 3-bit request program number (RPN) given in the command dword of the requesting APDU. When the APDU type is "external", the value of this field represents the physical port which received the packet, or the physical port which is to transmit this packet. Two fields related to physical port or destination 624 are physical id 626 and logical destination 628. These two fields further define where the packet is to be processed. An external host processor may request processing by creating a channel in PCE 14, CCE 16, or an application program running in KMCE 12. The label identifies the KMCE application in logical destination 628.

When the type of APDU is "internal" or "request", the field represents the destination of the physical subsystem that is to process this packet. The next two fields, the physical id 626 and logical destination 628, further define where the packet is to be processed when the destination is PCE 14, CCE 16, or KMCE 12.

When the type of APDU is "response", logical destination 628 identifies which process, controlled by the CC 100, receives the response APDU. The sender of the APDU determines the value used in this field by receiving the request APDU. The request APDU contains a requesting process number (RPN) in physical source 696 in the command dword.

An example of a preferred mapping of type of physical port or destination and the data unit is provided in FIG. 12. FIG. 12 shows a mapping of physical port or destination type bits 668 mapping to physical port or destination type 670. Each physical port or destination type shows a preferable bit map to physical port or destination location.

FIG. 13 illustrates a physical identification format suitable for use with the preferred embodiment of the present invention. In the preferred embodiment, physical id 626 qualifies logical destination 628 by determining the logical destination of the data unit (e.g., PCE 14, CCE 16, and KMCE 12). Physical id 626 identifies which processing resource contains the application program (e.g., PCE 14, CCE 16, and KMCE 12). Programs running in the PCE or CCE are programs identified by channel number. An application label identifying a process (e.g., cell and strand) identifies programs running in KMCE 12. Preferably, CC 100 uses physical id 626, to route the APDU during processing.

An example of a preferred bit map for physical id 626 is provided in FIG. 13. FIG. 13 shows a preferred mapping of physical id field bit 672 to physical id definition 673.

FIG. 14 illustrates a logical destination format suitable for use with the preferred embodiment of the present invention. In the preferred embodiment, logical destination 628 represents a channel number or an application label as identified by physical id 626. The 10-bit binary value for logical destination 628 allows 1024 channels or 1024 application labels as shown by logical destination bits 678 and logical destination definition 679.

When the logical destination is a channel number, the program is identified by a number. Preferably, the channel number is in the range of 0 to 1023. CC 100 uses the channel number to activate the program and context associated with the channel number in PCE 14 or CCE 16. The channel has previously been established as part of the activation process for the application. The initialization process which sets up a channel in KMCE 12 establishes the association of the channel number, program, processing engine (e.g., PCE 14 or CCE 16), and the associated context as described above.

When the logical destination is an application label, the data unit is processed by KMCE 12. CC 100 will route the data unit to KMCE 12 via shared memory 18. Data units are routed only when they meet the criteria established for the specific application. For example, if a data unit identifies a channel number for a process that does not exist, CC 100 discards the data unit.

FIG. 15 illustrates a length definition format suitable for use with the preferred embodiment of the present invention. In the preferred embodiment, PDU length field 630 represents a number between 0 and 4093 which indicates the number of dwords, including the FCS, which follow command dword 608. PDU length field 630 for DU header 606 defines the size of the data unit which follows. Preferably, the maximum application data unit size is 4094 dwords (131,008 bits). An example of a preferred bit map for PDU length field 630 is provided in FIG. 15. FIG. 15 shows the preferred mapping of PDU length definition bit field 684 to PDU length definition description 685.

FIG. 16 illustrates a data unit priority format suitable for use with the preferred embodiment of the present invention. In the preferred embodiment, priority bit field 634 defines a priority level for the APDU. The priority bit is preferably used by interface processors 13 and 15 to select the order of data unit processing. In the embodiment shown, there are two levels of priority. A zero, for example, may be used to specify non-real-time processing while a one may be used for specifying real-time processing. An example of a preferred bit map for priority bit field 634 is provided in FIG. 16. FIG. 16 shows the preferred mapping of priority bit field 634 priority value 690 to priority value description 691.

FIG. 17 illustrates a command dword format suitable for use in the preferred embodiment of the present invention. Command dword 608 is preferably the second dword in each APDU. Command dword 608 includes command id field 692 of 10 bits, response field 694 of 7 bits, physical source field 696 of 3 bits, logical source field 698 of 11 bits, and reserved bit 699. In the preferred embodiment command id field 692 specifies the function to be executed on a data unit. Functions are preferably defined for each channel program. In the preferred embodiment, there are no functions native to system 10. Functions may include for example, encrypt, decrypt, sign, authenticate, etc. A function such as encrypt for example, specifies to the application software that the data portion of the APDU, (e.g., parameter data field 610), should be encrypted. The encryption is performed using a program and context specified for that channel selected by physical id 626 and logical destination 628.

Response field 694 returns a processing status with the processed data unit. The response is generated by the processing unit of system 10. For example, PCE 14 may provide a 'processing complete' response to response field 694 at the conclusion of sending the data unit to the output interface processor. Likewise, CC 100 may send a "default" response value to the sending processor when the data unit transfer fails. Response field 694 may be dependent on the specific application or channel program.

Physical source field 696 is used in a request type APDU to identify which program issued the request. CC 100, for example, may use the RPN to map to one of the processes currently operating on one of the cryptographic engines. Physical source field 696 returns a value in a response APDU channel index which allows CC 100 to route the APDU to the correct processor. In the preferred embodiment, when the APDU originates from an external host the RPN field is not used and is set to zero. By identifying programs, physical source field 696 requests and passes commands, parameters and data between different channels running on the execution units of system 10. Since the processing units may run processes concurrently, the processing units also use the data units in the communication structure. Accordingly, through the use of physical source field 696, processes may transfer information between themselves using the CC 100.

Logical source field 698 identifies the channel which is sending the APDU. Logical source field 698 may be the channel number of the channel which is executing in processing engine (e.g., PCE 14 or CCE 16) or the application label which is assigned to a cell and strand combination which is executing within KMCE 12.

In the preferred embodiment, reserved bit 699 is reserved for internal processing within CC 100.

FIG. 18 illustrates a channel table description suitable for use in the preferred embodiment of the present invention. In the preferred embodiment, channel table 700 is stored in a memory (e.g., memory 19 (FIG. 1)) and is comprised of fields of information grouped into a row format. Each row describes certain characteristics of a channel within system 10 (FIG. 1). A channel is a thread of processing which is separate from other channels and performs operations on data units. A channel may be, for example, the routing of a data unit from a source location to a target location or performing a cryptographic operation on a data unit. System 10 performs as a multi-tasking engine capable of switching between different channels. Data units are processed by channels and routed within system 10. CC 100 is the functional element which distributes data units which are received from external hosts via PTIP 13 and CTIP 15. CC 100 routes and schedules data units for processing.

Channel table 700 contains information required to install and re-install a channel. Pointers to the locations where program and context are located are included in a row of channel table 700. When channel index 716 points to a channel which is not allocated, CC 100 routes the data unit to KMCE 12 where exception processing is performed.

A channel index is assigned by an application program (performed by KMCE 12) when a channel is created external to CC 100. Channel table 700 is loaded into CC 100 after being created by KMCE 12. KMCE 12 creates a new entry or deletes an entry each time a new channel is created or removed, respectively. KMCE 12 populates the fields in channel table 700. CC 100 uses channel table 700 values to install channels for the execution of programs on data units. Preferably, CC 100 modifies allocated/activity field 702. Allocated/activity field 702 is used to track the most recently used channels. Preferably, least used channels may be deactivated as needed.

Each time a channel is created, entries are added to the table. Each time a channel table entry is removed the channel becomes inactive. Inactive channels are ones in which a context and/or program for a channel have been moved to external storage which is inaccessible by the channel creation FSM of CC 100. An application program operating on KMCE 12 deallocates channels and removes fields of information from channel table 700. Memory which stores inactive channel data may be external to CC 100.

When a channel is established, system 10 can process a data unit in PCP 17 on a per channel basis without any external intervention. Maximum throughput during processing (e.g., encryption, decryption, etc.) of data units is achieved via individual channel processing in the PCP. In the preferred embodiment, a typical application passes data units through PCP 17 with no intervention from KMCE 12.

Channel table 700 represents information for each channel managed by CC 100. Preferably, channel table 700 is between 1 to 1024 dwords. CC 100 uses a row of channel table 700 to set up each channel for PCE 14 and CCE 16.

In channel table 700, allocated activity field 702 is a 2 bit field which identifies the validity and activity of a channel (row). In the preferred embodiment, a "00" value defines the channel (row) to be invalid. Values of "01", "10", and "11" each indicate a valid channel (row). When a data unit meets the FCS checking criteria but references an invalid channel the KMCE is notified.

Values "01", "10", and "11" represent the activity portion of allocated activity field 702. Values other than "00" indicate processing activity for the channel. When a data unit is processed for a channel, CC 100 updates allocated activity field 702. KMCE 12 uses allocated activity field 702 to determine when channels are infrequently used.

In the preferred embodiment, a KMCE application alerts channel programs by asserting request service bit (RSB) 704. By asserting RSB 704, CC 10 delivers a request service notice to the associated channel program. Preferably, the channel program use RSB 704 to trigger a request data unit to KMCE 12. KMCE 12 removes the assertion in RSB 704 to acknowledge a request for service. For example, this is used when one channel requests service from another channel when processing a data unit. Since the KMCE loads all of the channels and assigns channel numbers, the first channel may not know the channel number associated with the channel which provides the needed service. So, the first channel requests the channel number representing the channel providing the service from KMCE 12.

In the preferred embodiment, suspended channel 706 is a 1 bit field. When asserted, suspended channel 706 indicates when KMCE 12 has taken a channel out of service. Preferably, KMCE 12 releases a suspended channel by clearing suspended channel 706.

In the preferred embodiment, program id 708 is a 3 bit field. Program id 708 contains the ID code for the program. Program id 708 indicates which program is associated with a channel. Program id 708 represents a value from a program address table. CC 100 uses program id 708 to identify the programs which are loaded into PCE 14 and CCE 16. A program address table allows a many to one relationship between channels and programs.

In the preferred embodiment, variable address 710 is a 17 bit field. Variable address 710 represents the starting address in PCP 17 memory space (e.g., CPRAM 9 and external RAM) where the variable for the associated channel is located. CC 100 determines when the variable is currently in the active or shadow variable state memory (associated with PCE 14 or CCE 16) or is in CPRAM or EXTRAM.

In the preferred embodiment, state length 712 is a 5 bit field. State length 712 defines the state data length. Preferably, state length 712 can range between 0 and 32 dwords. Values of "00000" through "11110" describe state lengths of 0 through 30 respectively, and a value of "11111" defines a state length of 32 dwords.

In the preferred embodiment, MLS key tag 714 is a 3 bit field which defines the security level of the channel key. MLS key tag 714 is compared to the tag received in the data unit to verify the security level. Preferably, the mandatory access control (MAC) security level of the channel key is higher than the data to be encrypted. A data unit tag defines the security level for incoming data.

Thus, what has been shown are an improved cryptographic controller and method. What has also been shown are a cryptographic controller and method which are programmable and capable of performing various and changeable communications functions. Also shown are a cryptographic controller and method which provide a high security component with limited accessibility. What has also been shown are a cryptographic controller and method which rapidly and securely switches programs and context for each data unit processed.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of scheduling data units for processing comprising the steps of:
   assigning a direct memory access unit for transferring a data unit to a processing engine based on information in the data unit;
   identifying a channel program and associated context for processing the data unit in response to processing instructions in the data unit; and
   instructing said processing engine to load the channel program and associated context into said processing engine,
   wherein said data unit is a first data unit, said direct memory access unit is a first direct memory access unit of a plurality of direct memory access units, and wherein data units include response type data units and request type data units, and wherein the instructing step includes the step of instructing a first of a plurality of processing engines to load a first of a plurality of channel programs, and wherein said first processing engine creates a request type data unit during the processing of said data unit, said request type data unit requiring further processing, and wherein the method further comprising the steps of:
      setting up one of said plurality of processing engines to process said request type data unit in accordance with processing information in said request type data unit, wherein said one processing engine processes said request type data unit and provides a response type data unit; and
      assigning said direct memory access unit for transferring said response type data unit to said first processing engine for continuing processing said first data unit.

2. A method as claimed in claim 1 further comprising the step of reading a header of a second data unit to determine whether said second data unit is said request type data unit or said response type data unit, and
   when said second data unit is said request type data unit, the setting up step includes the steps of:
      assigning said second data unit one of said plurality of direct memory access units for transferring said second data unit to said one processing engine;
      identifying one of said plurality of channel programs and associated context for processing said second data unit in response to processing instructions in said second data unit; and
      instructing said one processing engine to load said one channel program and associated context into said one processing engine.

3. A method as claimed in claim 1 further comprising the steps of:
   tracking memory locations of said data units and said channel programs and associated context;
   checking addressing information for each of said direct memory access units; and
   providing an alarm signal when an overlap in memory locations is detected.

4. A method as claimed in claim 1 wherein the assigning step includes the step of selecting one of said plurality of processing engines based on said first channel program.

5. A method as claimed in claim 1 wherein said response type data unit is in response to information requested by said first processing engine during the processing of said first data unit in accordance with said first channel program, and wherein the method further comprising the step of reading a header of a second data unit to determine whether said second data unit is said response type data unit, and when said second data unit is said response type data unit, the method includes the steps of:
   assigning said first direct memory access unit to transfer said second data unit to said first processing engine when said first processing engine is processing said first channel program.

6. A method as claimed in claim 5 wherein when said first processing engine is not currently processing said first channel program, the method further comprises the steps of:
   assigning said first direct memory access unit to transfer said second data unit to said first processing engine; and
   assigning said first direct memory access unit to transfer said first channel program and associated context to said first processing engine for processing said second data unit.

7. A method of scheduling data units for processing comprising the steps of:
   assigning a direct memory access unit for transferring a data unit to a processing engine based on information in the data unit;
   identifying a channel program and associated context for processing the data unit in response to processing instructions in the data unit; and
   instructing said processing engine to load the channel program and associated context into said processing engine,
   wherein the identifying step further comprises the step of determining when the channel program is encrypted and stored in an external memory, and
   when the channel program is encrypted, the method further comprises the steps of:
      instructing a key management crypto-engine to load a key;
      instructing a second direct memory access unit to transfer said channel program to said key management crypto-engine;
      instructing said key management crypto-engine to decrypt said channel program; and
      instructing said processing engine to load the decrypted channel program into an associated memory for execution by said processing engine.

8. A method of scheduling data units for processing comprising the steps of:
assigning a direct memory access unit for transferring a data unit to a processing engine based on information in the data unit;
identifying a channel program and associated context for processing the data unit in response to processing instructions in the data unit; and
instructing said processing engine to load the channel program and associated context into said processing engine,
wherein the associated context defines prior state and variable data associated with said channel program after processing a prior data unit.

9. A method of scheduling data units for processing comprising the steps of:
assigning a direct memory access unit for transferring a data unit to a processing engine based on information in the data unit;
identifying a channel program and associated context for processing the data unit in response to processing instructions in the data unit;
instructing said processing engine to load the channel program and associated context into said processing engine;
determining when said channel program and associated context are presently loaded in said processing engine; and
refraining from performing the instructing step when said channel program and associated context are presently loaded in said processing engine.

10. A method of scheduling data units for processing comprising the steps of:
assigning a direct memory access unit for transferring a data unit to a processing engine based on information in the data unit;
identifying a channel program and associated context for processing the data unit in response to processing instructions in the data unit; and
instructing said processing engine to load the channel program and associated context into said processing engine,
wherein when said data unit is in an external memory location, the assigning step includes the step of assigning a second direct memory access unit for transferring the data unit from said external memory location.

11. A method of scheduling data units for processing comprising the steps of:
assigning a direct memory access unit for transferring a data unit to a processing engine based on information in the data unit;
identifying a channel program and associated context for processing the data unit in response to processing instructions in the data unit; and
instructing said processing engine to load the channel program and associated context into said processing engine,
wherein the instructing step includes the step of instructing said processing engine to load the channel program and associated context from a memory location into a shadow memory of the processing engine, said processing engine executing another of said channel programs from an active memory associated with said processing engine, and wherein the instructing step is performed during processing of a prior data unit in accordance with said another channel program by said processing engine.

12. A method of scheduling data units for processing comprising the steps of:
assigning a direct memory access unit for transferring a data unit to a processing engine based on information in the data unit;
identifying a channel program and associated context for processing the data unit in response to processing instructions in the data unit; and
instructing said processing engine to load the channel program and associated context into said processing engine,
wherein said channel program and associated context have a frame check sequences associated therewith, and the method further comprise the steps of:
transferring said channel program and associated context to said processing engine; and
checking each of said frame check sequences after performance of the transferring step.

13. A method of scheduling data units for processing comprising the steps of:
assigning a direct memory access unit for transferring a data unit to a processing engine based on information in the data unit;
identifying a channel program and associated context for processing the data unit in response to processing instructions in the data unit; and
instructing said processing engine to load the channel program and associated context into said processing engine,
wherein said data unit has a frame check sequence associated therewith, and the method further comprise the steps of:
transferring said data unit to said processing engine; and
checking said frame check sequence after performance of the transferring step.

14. A method of scheduling data units for processing comprising the steps of:
assigning a direct memory access unit for transferring a data unit to a processing engine based on information in the data unit;
identifying a channel program and associated context for processing the data unit in response to processing instructions in the data unit; and
instructing said processing engine to load the channel program and associated context into said processing engine,
wherein the identifying step further comprises the step of determining when the associated context is encrypted and stored in an external memory, and
when the associated context is encrypted, the method further comprises the steps of:
instructing a key management crypto-engine to load a key;
instructing a second direct memory access unit to transfer said associated context to said key management crypto-engine;
instructing said key management crypto-engine to decrypt said associated context; and
instructing said processing engine to load the decrypted associated context into an associated memory for execution by said processing engine.

15. A method of processing data units in a cryptographic processing system comprising a plurality of direct memory access units, a data unit decoder and a plurality of processing engine managers, the method comprising the steps of:

assigning a first of said direct memory access units for transferring a first data unit to a first of said processing engines based on information in the data unit;

identifying a first channel program of a plurality of channel programs and associated context for processing the first data unit in response to processing instructions in said first data unit;

instructing said first processing engine to load the first channel program and associated context into said first processing engine;

said first processing engine forming a request type data unit during the processing of said first data unit, said request type data unit requiring further processing;

setting up one of said plurality of processing engines to process said request type data unit in accordance with processing information in said request type data unit, wherein said one processing engine processes said request type data unit and provides a response type data unit; and assigning said first direct memory access unit for transferring said response type data unit to said first processing engine for continuing processing said first data unit; and when said first processing engine is not currently processing said first channel program, the method further comprises the steps of:

assigning said first direct memory access unit to transfer said second data unit to said first processing engine; and assigning said first direct memory access unit to transfer said first channel program and associated context to said first processing engine for processing said second data unit.

16. A method as claimed in claim 15 further comprising the step of determining when the first channel program and associated context are encrypted and stored in an external memory, and when the first channel program and associated context are encrypted, the method further comprises the steps of:

instructing a key management crypto-engine to load a key;

instructing a second direct memory access unit to transfer said first channel program and associated context to said key management crypto-engine;

instructing said key management crypto-engine to decrypt said first channel program and associated context; and instructing said processing engine to load the decrypted channel program and associated context into said processing engine.

17. A method as claimed in claim 15 wherein said first channel program and associated context have a frame check sequences associated therewith, and wherein said data unit has a data unit frame check sequence associated therewith, the method further comprises the steps of:

transferring said first channel program and associated context to said first processing engine;

transferring said data unit to said first processing engine; and checking each of said frame check sequences after performance of the transferring steps.

18. A controller for managing data unit processing comprising:

a data unit decoder for reading a header of a data unit and identifying one of a plurality of processing engines and one of a plurality of channel programs and associated context for processing said data unit;

a plurality of direct memory access units for transferring data units and said channel programs and associated context from memory locations to selected ones of said processing engines; and a plurality of processing engine managers for causing said channel programs and associated context to be installed in said processing engines, and instructing one of said processing engines to process said data unit upon completion of processing of a prior data unit.

19. A controller as claimed in claim 18 further comprising a memory manager for tracking memory locations of said data units and said channel programs and associated context, and for checking addressing information for each of said direct memory access units, said memory manager providing an alarm signal when an overlap in memory locations is detected.

20. A controller as claimed in claim 18 wherein said data unit is a first data unit, and wherein data units include response type data units and request type data units, and wherein the data unit decoder instructs a first of a plurality of processing engines, and wherein said first processing engine having means for creating a request type data unit during the processing of said data unit, said request type data unit requiring further processing, and wherein the processing engine managers includes means for:

setting up one of a plurality of processing engines to process said request type data unit in accordance with processing information in said request type data unit, wherein said one processing engine processes said request type data unit and provides a response type data unit; and assigning said direct memory access unit for transferring said response type data unit to said first processing engine for continuing processing said first data unit.

21. A controller as claimed in claim 20 wherein the data unit decoder has means for reading a header of a second data unit to determine whether said second data unit is said request type data unit or said response type data unit, and when said second data unit is said request type data unit, the processing engine managers assign said second data unit one of a plurality of direct memory access units for transferring said second data unit to one of said processing engines, and identify one of a plurality of channel programs and context for processing said second data unit in response to processing instructions in said second data unit, and instruct said one processing engine to load said one channel program and context into said one processing engine.

22. A controller as claimed in claim 20 wherein said response type data unit is in response to information requested by said first processing engine during the processing of said first data unit in accordance with said first channel program, and wherein the data unit decoder includes means for reading a header of a second data unit to determine whether said second data unit is said response type data unit, and when said second data unit is said response type data unit, the processing engine manager assigns said first direct memory access unit to transfer said second data unit to said first processing engine when said first processing engine is processing said first channel program.

23. A controller as claimed in claim 22 wherein when said first processing engine is not currently processing said first channel program, the processing engine managers have means for assigning said first direct memory access unit to transfer said second data unit to said first processing engine, and assigning said first direct memory access unit to transfer said first channel program and context to said first processing engine for processing said second data unit.

* * * * *